United States Patent
Dasgupta et al.

(10) Patent No.: US 6,881,513 B2
(45) Date of Patent: Apr. 19, 2005

(54) LEAK RETARDANT AUTOMOTIVE BATTERY

(75) Inventors: Partha Dasgupta, Calcutta (IN); Subhradas Bandyapadhyayay, West Bengal (IN); Debashish Mazumdar, Calcutta (IN); Surendra Kumar Mittal, Calcutta (IN)

(73) Assignees: Exide Industries Ltd., Calcutta (IN); Shin-Kobe Electric Machinery Co., Ltd., Tokyo (JP)

( * ) Notice: Subject to any disclaimer, the term of this patent is extended or adjusted under 35 U.S.C. 154(b) by 274 days.

(21) Appl. No.: 10/178,982

(22) Filed: Jun. 25, 2002

(65) Prior Publication Data

US 2003/0013006 A1 Jan. 16, 2003

(30) Foreign Application Priority Data

Jul. 2, 2001 (JP) .................................... 2001-200685

(51) Int. Cl.⁷ ............................................ H01M 2/12
(52) U.S. Cl. ............................ 429/84; 429/86; 429/87; 429/88
(58) Field of Search .................. 429/82, 84, 86–89, 429/175

(56) References Cited

U.S. PATENT DOCUMENTS

| 5,380,604 | A | | 1/1995 | Hampe et al. ................. 429/84 |
| 5,422,199 | A | * | 6/1995 | Adams et al. ................. 429/88 |
| 5,424,146 | A | | 6/1995 | Lin ............................. 429/84 |
| 5,683,830 | A | | 11/1997 | Fritts et al. .................... 429/84 |
| 5,843,593 | A | | 12/1998 | Fritts et al. .................... 429/84 |
| 5,846,671 | A | * | 12/1998 | Stocchiero .................... 429/88 |

FOREIGN PATENT DOCUMENTS

| DE | 3444011 A1 | * | 6/1986 | ............ H01M/2/12 |
| DE | 3729610 A | * | 3/1989 | ............ H01M/2/04 |
| EP | 0 639 862 | | 9/1996 | ............ H01M/2/12 |

* cited by examiner

*Primary Examiner*—Gregg Cantelmo
(74) *Attorney, Agent, or Firm*—Pearne & Gordon LLP

(57) ABSTRACT

A leak retardant automotive battery includes a housing containing a plurality of cells that each have a filling plug and a battery cover closing the housing above the cells. The battery cover includes a central blockage that divides the housing into two compartments that each contain a set of cells. The cells in each compartment are connected by vent holes in the battery cover that are respectively connected to associated vent cap assemblies so as to separately vent each compartment through its associated vent cap assembly.

11 Claims, 12 Drawing Sheets

LEAK RETARDANT AUTOMOTIVE BATTERY

TECHNICAL FIELD OF THE INVENTION

This invention relates to an automotive battery and more particularly relates to a leak retardant automotive battery adapted to retard a leakage of electrolyte out of a battery housing.

BACKGROUND OF THE INVENTION

For automotive applications, batteries with free electrolyte are still maintaining their pre-eminent position in the industry due primarily to lower cost as well as ease of manufacturing. Furthermore, the flooded battery designs are known to have certain technical advantages in comparison to acid-starved designs; but the major limitation of these (flooded) designs lies in their inherent possibility of acid leakage during handling, transportation and charging, resulting from internal pressure build-up. As a result, a small percentage of automotive batteries are being converted to leak proof, VRLA (Valve Regulated Lead Acid) type assembled with AGM (Absorptive Glass Mat) separators in spite of a substantial cost penalty.

It will be noted from the above that there is a strong need to develop low cost, leak retardant/resistant batteries containing free electrolyte, particularly suitable for the use in the automobiles.

Hitherto, there have been many attempts to develop leak resistant battery with free electrolyte using special design of battery covers. Of the several patents filed in this connection, a few of them are being cited below for reference in view of their relative importance:

Patent No. Publication Date

U.S. Pat. No. 5,843,593 filed Dec. 1, 1998; U.S. Pat. No. 5,683,830 filed Nov. 4, 1997; U.S. Pat. No. 5,424,146 filed Jun. 13, 199; U.S. Pat. No. 5,380,604 filed Jan. 10, 1995; EP 0639862 B1 filed Sep. 18, 1996.

In most of the patents cited above, leak retardant characteristics are achieved by using a relatively complex design battery cover, which usually is composed of an upper lid and a lower lid. More particularly, there is a second part of the battery cover, which is fixed with the main cover either by heat sealing or ultrasonically. In the event of battery tilting sideways or in the inverted position, some electrolyte flows out from the container into the space provided between the two parts of the battery cover, which is then allowed to flow back when the battery is restored to its upright position.

The design based on two-piece battery cover is relatively expensive and more complex at the manufacturing stage. Clearly, there is a need for a simple, one-piece leak retardant cover design without adversely affecting the cost competitiveness.

SUMMARY OF THE INVENTION

Accordingly, it is a principal object of the invention to provide a leak retardant automotive battery having a one-piece battery cover having a simple construction without complicating the manufacture and therefore being able to manufacture more inexpensively.

In accordance with a fundamental feature of the invention, there is provided a leak retardant automotive battery comprising a housing for a plurality of cells housed therein and having a filling plug, respectively; a battery cover fitted to the housing on its top in a liquid tight manner so as to overlie the cells; and a pair of terminals mounted on the battery cover and connected to said cells, the battery cover having a vent cap assembly liquid-tightly provided in an end of a vent line which communicates the cells with each other, characterized in that the battery cover has means to retard transfer of electrolyte between the vent line and an atmosphere.

In accordance with one preferred aspect of the present invention, there is provided a leak retardant automotive battery comprising a housing for a plurality of cells housed therein and each having a filling plug, respectively; a battery cover fitted to the housing on its top in a liquid tight manner so as to overlie the cells and a pair of terminals mounted on the battery cover and connected to the cells, the battery cover having a vent cap assembly liquid-tightly provided in an end of a vent line which communicates the cells with each other, characterized in that the battery cover has central blockage to divide the vent line into some cell groups whereby electrolyte is prevented from moving between the cell groups.

In accordance with another preferred aspect of the invention, there is provided a leak retardant automotive battery comprising a housing for a plurality of cells housed therein and having a filling plug, respectively; a battery cover fitted to said housing on its top in a liquid tight manner so as to overlie the cells; and a pair of terminals mounted on said battery cover and connected to said cells, said battery cover having a vent cap assembly liquid-tightly provided in an end of a vent line which communicates the cells with each other, characterized in that the vent cap assembly comprising a vent cap having a helical path provided on an outer periphery of the vent cap and communicating with the end of the vent line and the vent cap having a water-repellant gas filter communicating with a downstream end of the helical path and filtering vented gases.

In accordance with further preferred aspect of the present invention, there is provided a leak retardant automotive battery comprising a housing for a plurality of cells housed therein, each of the cells having a filling plug, a battery cover fitted to the housing to overlie the cells and a pair of terminals mounted on the battery cover and connected to the cells, characterized in that the battery cover is divided into two compartments by means of a central blockage, each compartment overlying a set of cells; that vent holes in the battery cover overlying each set of cells are connected by means of a vent line so that the cells in each set are in communication with each other; and that the vent lines are connected at their respective one end to the central blockage so as to isolate the two compartments; and that a vent cap assembly is provided at the other end of each of the vent lines for escape of vented gases.

The central blockage may preferably comprise an additional separating wall to isolate the two vent lines and a sealing ring may be provided for sealing the body integrated with the partition wall in the battery cover.

The vent cap assembly may comprise a vent cap fitted to the other end of the vent line, and a gas filter may be fitted into the vent cap for allowing the vented gas to escape.

In one embodiment of the present invention, the vent cap may have a vent hole in communication with the other end of the vent line, a first upwardly extending vertical hole extending from the vent hole to the outer periphery of the vent cap, a helical path on the outer periphery connected at its one end to the first upwardly extending vertical hole and at its other end to a second downwardly extending vertical hole extending to the center of the vent cap so as to be in communication with the gas filter.

The gas filter may be preferably a water-repellant microporous gas filter. The microporous filter may preferably have a grain size of about 270 microns.

The gas filter may be flush fitted into the vent cap and then covered a filter cover having a hole for escape of vented gas.

Each filling plug having an "O" ring seal may be fitted into each cell.

The present invention is based on making a battery leak retardant by creating an air-lock, in addition to using a specially designed vent tube tightly enclosing a microporous gas filter to resist free flow of acid when the battery is rotated or tilted in either direction.

A multi-cell (12 volt) configuration with side venting arrangement is divided into two isolated chambers by blocking the common, side vent line through the battery cover at a location corresponding to the middle partition of the battery container. This leaves each of the three-cell battery chambers with a single vent opening fitted with a special type of vent tube enclosing a microporous gas filter.

In addition to providing an effective air-lock to prevent the free flow of electrolyte when the battery is tilted in either direction, there is an additional advantage in the present invention of minimizing the transfer of electrolyte from the upper to the lower cells when tilted on the shorter side along the vent line. This is due to the fact that the blockage on the vent line in the middle of the battery cover prevents the transfer of electrolyte from the upper three cells to the lower three cells. As a result, after the tilt for a stipulated period, when the battery is reverted to its original upright condition, a negligible cell to cell variation in the electrolyte levels is observed, as compared to the normal, side vented designs having a common vent line, through the cover.

In the present invention, the vent cap containing the microporous filter is so designed that the electrolyte is required to traverse vertically up and move along the helical path on the periphery and then allowed to descend to its central position before coming in contact with the microporous gas filter. This arrangement provides a significant resistance to the flow of electrolyte when the battery is tilted in different directions.

Another notable feature of the present invention is that the vent cap assembly can be easily pushed fitted and locked-in into the side vent line without the need for any separate heat sealing or ultrasonic sealing. This simplifies the manufacturing operation, thereby resulting in lower cost.

Furthermore, in the vent cap used in the battery of the present invention, a fine grain (approx. 270 microns) microporous gas filter can be used, which is made of plastic alloy and then chemically treated to exhibit water-repellant characteristics. This provides a substantial resistance to the leakage of electrolyte through the vent hole.

BRIEF DESCRIPTION OF THE DRAWINGS

The above and other objects and features of the invention will be apparent from the detailed description of the preferred embodiments of the invention, which are described and illustrated with reference to the accompanying drawings, in which.

DETAILED DESCRIPTION OF PREFERRED EMBODIMENTS

Figure 1:
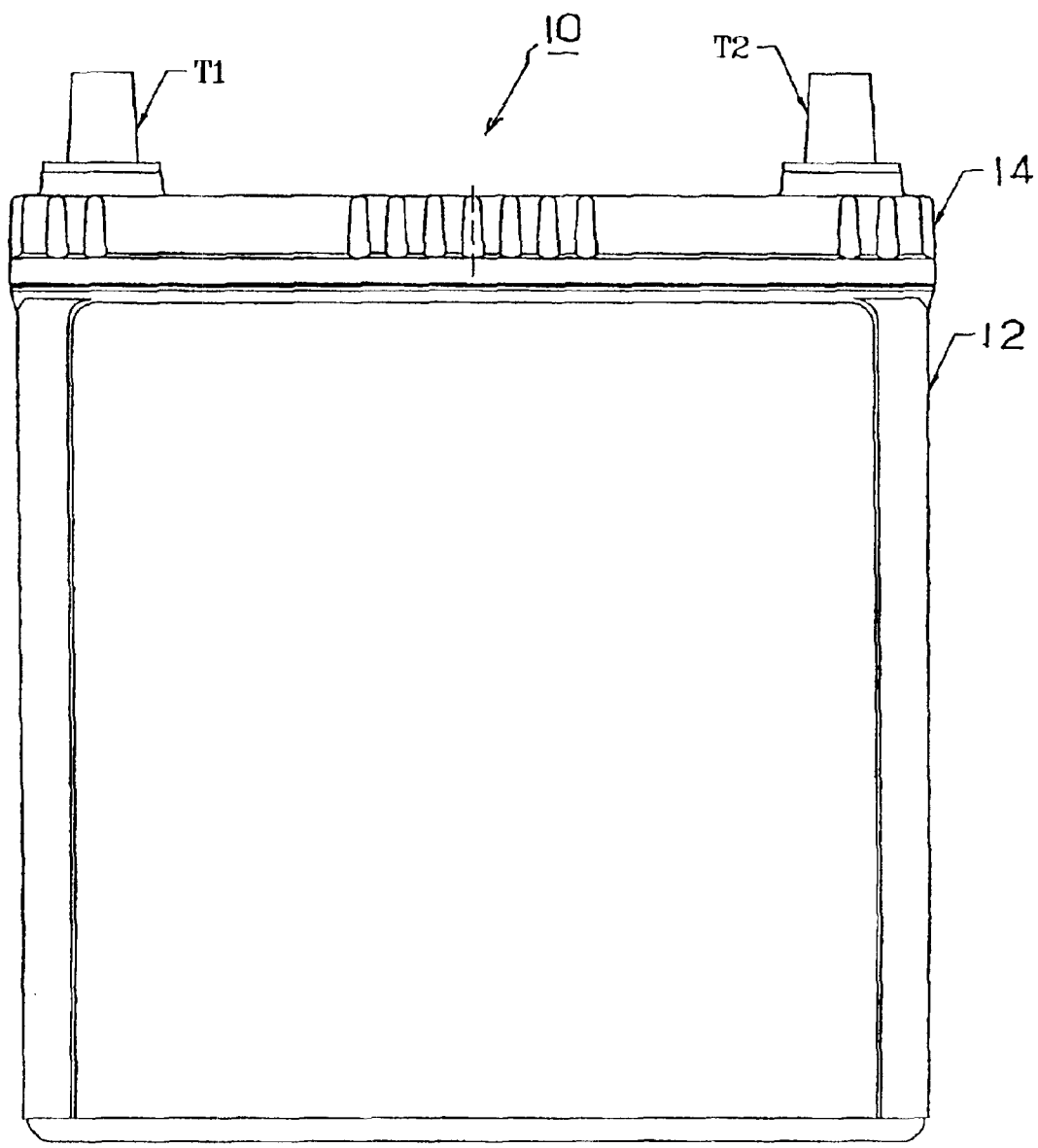
FIG. 1 is a front elevation view of an automotive battery according to the present invention.
Figure 2:
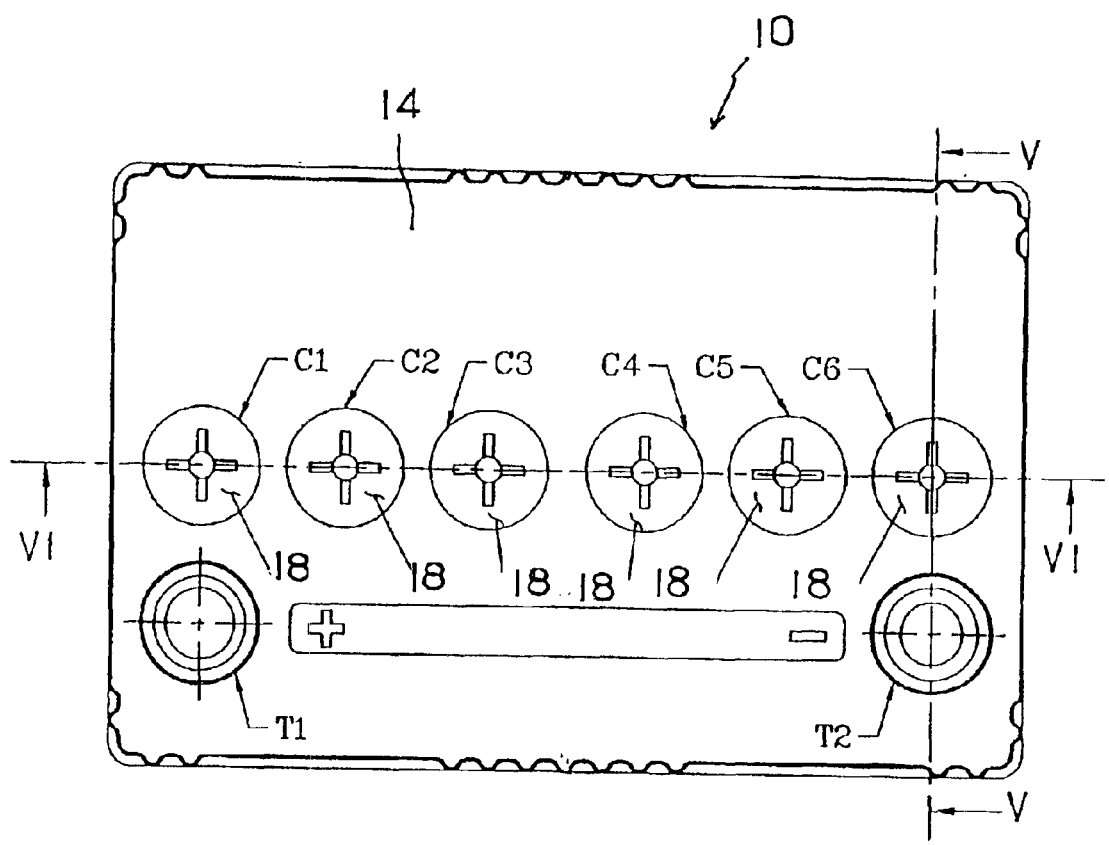
FIG. 2 is a plan view of the battery of FIG. 1.
Figure 3:
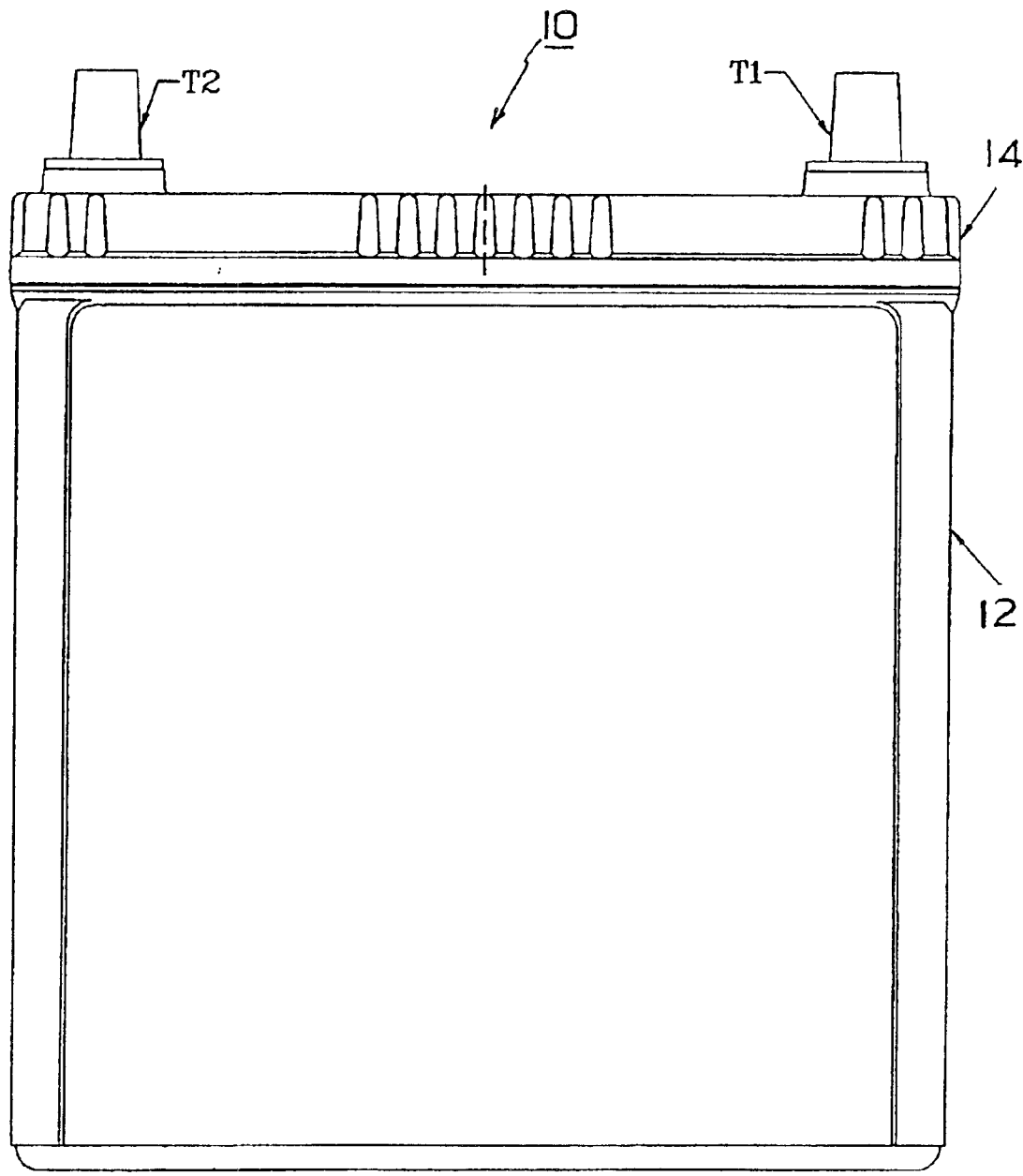
FIG. 3 is a rear view of the battery of FIG. 1.
Figure 4:
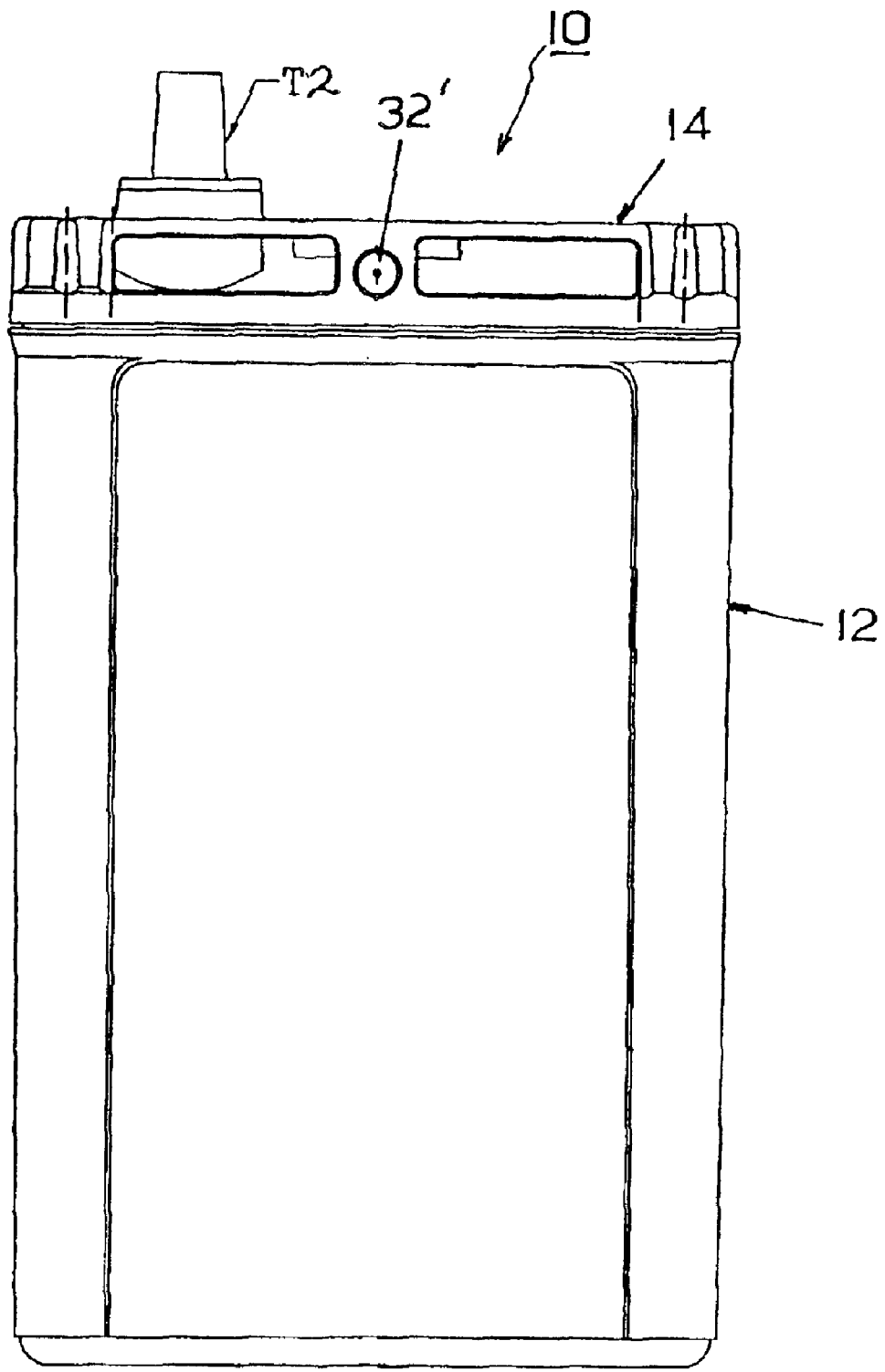
FIG. 4 is a side elevational view of the battery of FIG. 1.
Figure 5:
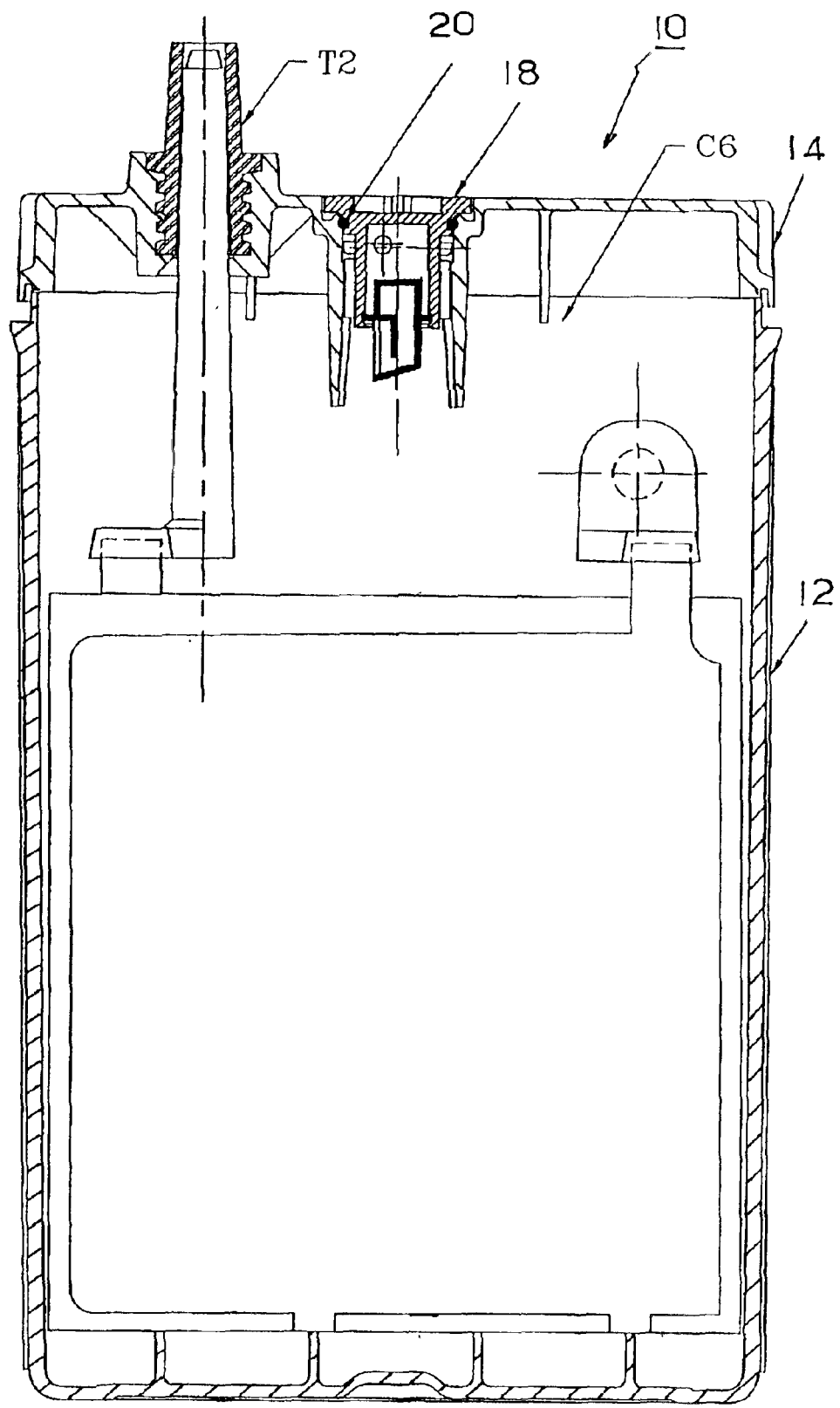
FIG. 5 is an enlarged sectional view along line V—V in FIG. 2.
Figure 6:
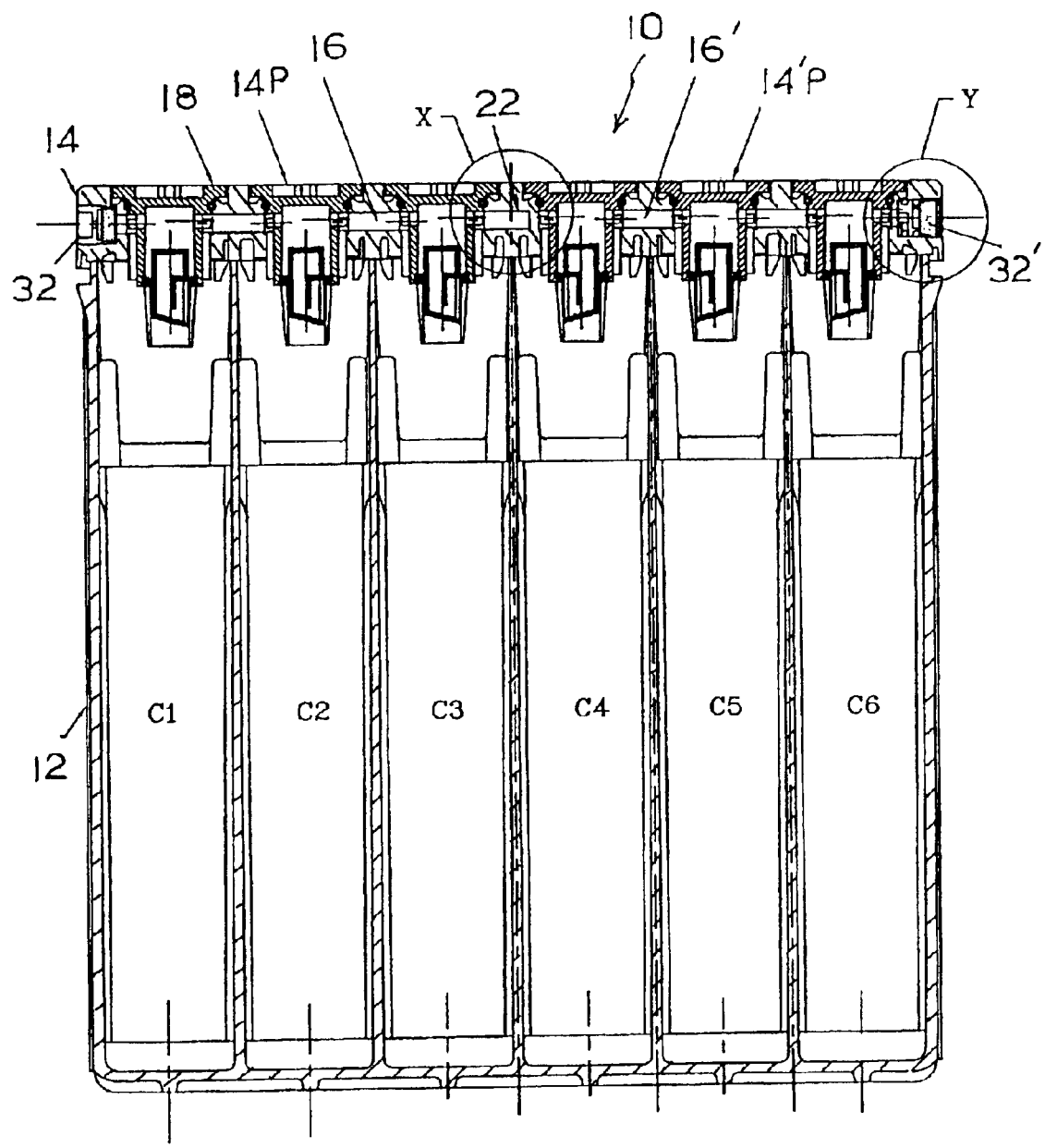
FIG. 6 is a sectional view along line VI—VI in FIG. 2.

The invention will now be described with reference to accompanying drawings, which show a preferred embodiment of the invention. In the accompanying drawings, FIGS. 1 through 6 illustrate a leak retardant automotive battery according to the present invention. The battery has a housing 12 in which six cells C1 to C6 are housed as shown in FIG. 6.

A battery cover 14 is fitted on and heat-sealed to the housing 12 so that the undersurface of the battery cover 14 is flush with the cells C1 to C6. Battery terminals T1 and T2 are connected to the cells C1 to C6.

The battery cover 14 is divided into two compartments 14P and 14'P as can be seen from FIG. 6, so that the compartment 14P covers the cells C1 to C3 and the compartment 14'P covers the cells C4 to C6.

In the compartment 14P, a side vent line 16 interconnects the spaces above the cells C1 to C3. Similarly, a side vent line 16' in compartment 14'P interconnects the spaces above the cells C4 to C6.

The cells C1 to C6 are provided with filling plugs 18 which extend into and are flush with the top surface of the cover 14. It can be seen from FIG. 5 that the filing plug 18 passes through the cover 14 into the cell C6 and is screwed onto the cover 14 by means of an "0" ring 20 so that no electrolyte contained in the cell spills out. The filling plugs 18 corresponding to the other cells C1 to C5 are similarly screwed onto the cover 14. All the filling plugs 18 are closed after the electrolyte is filled.

In the battery cover 14 are provided side vent line 16 and 16' in parallel with long sides of the battery across the cells so as to vent gases through the filling plugs 18. The gases from the respective cells are adapted to reach the vent lines 16 and 16' through the respective filling plugs 18.

In the illustrated embodiment, at the middle of the battery 12, central blockage means 22 to block the side vent lines 16 and 16' from each other is provided in the battery cover 14.

Figure 7:
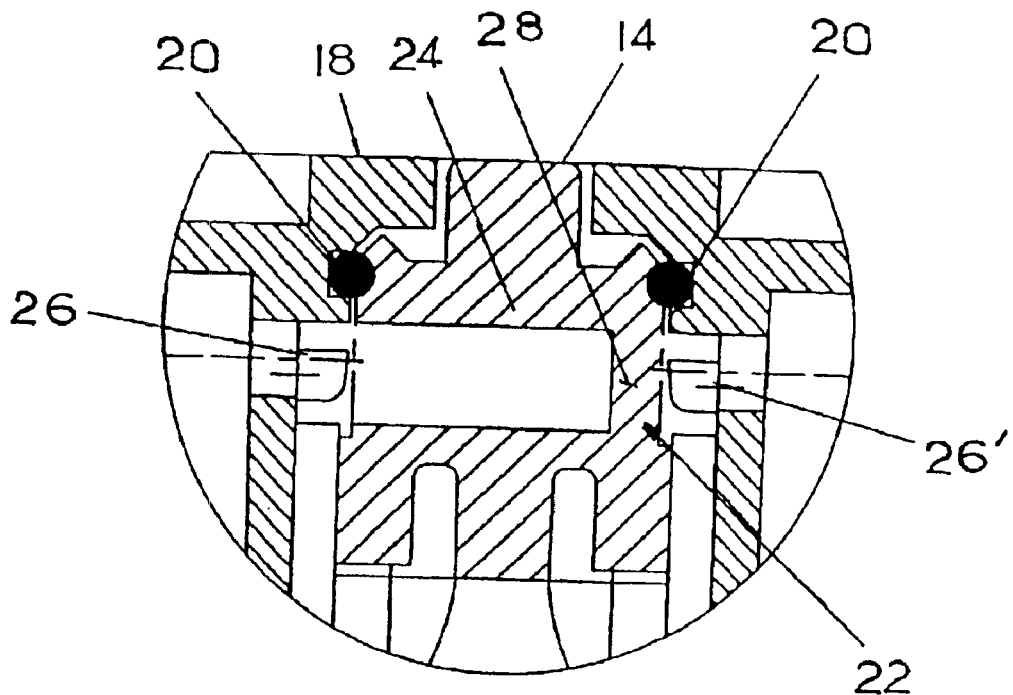
FIG. 7 is an enlarged view of a central blockage means of a battery cover as shown at a circled portion X marked in FIG. 6

This is marked as X in FIG. 6 and shown in detail in FIG. 7. The central blockage means 22 comprises a separating wall 28 integrated with a partition wall 24 in the battery cover 14. The separating wall 28 is isolating the two side vent lines 16 and 16'. The gas from the cells C1 to C3 as well as from the cells C4 to C6 enters the vent lines 16 and 16', respectively through respective holes 26 and 26' in the filling plugs 18. The filling plugs 18 fitted with "O" rings 20 are screwed onto the cover 14. Thus, it will be noted that the vent lines 16 and 16' are isolated from each other.

Figure 8:
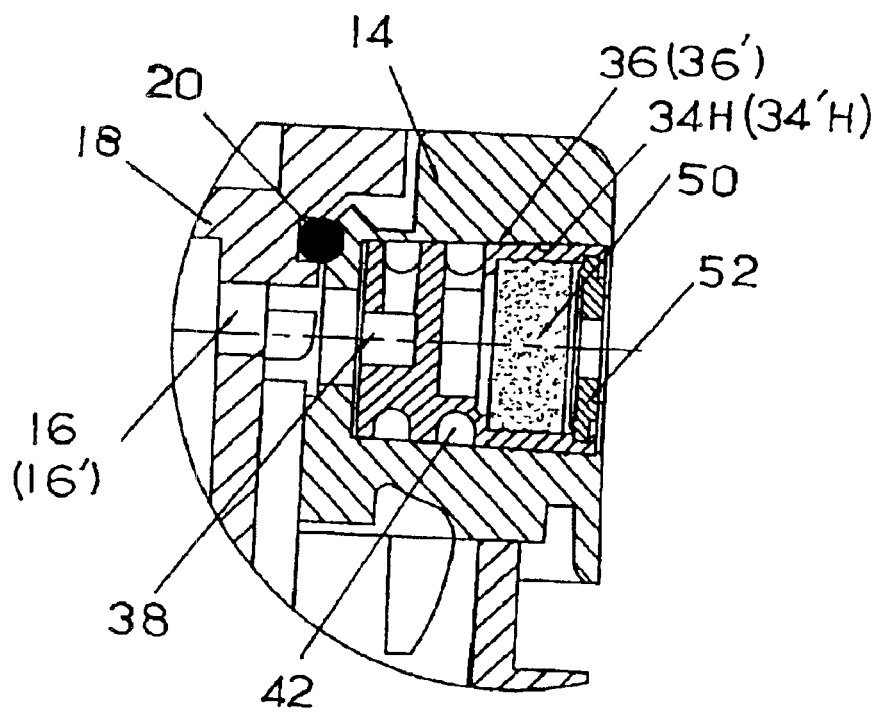
FIG. 8 is an enlarged view of a vent cap assembly used in the invention and provided in the battery cover as shown at a circled portion Y marked in FIG. 6.

Vent cap assemblies 32 and 32' are push-fitted at the other ends of the side vent lines 16 and 16', respectively. One of the vent cap assemblies 32' is marked as Y in FIG. 6 and shown in detail in FIG. 8. In the other ends of the side vent lines, there are cylindrical holes 34H and 34H' into which the vent cap assemblies are fitted on the sides of the battery cover 14, respectively.

Figure 9:
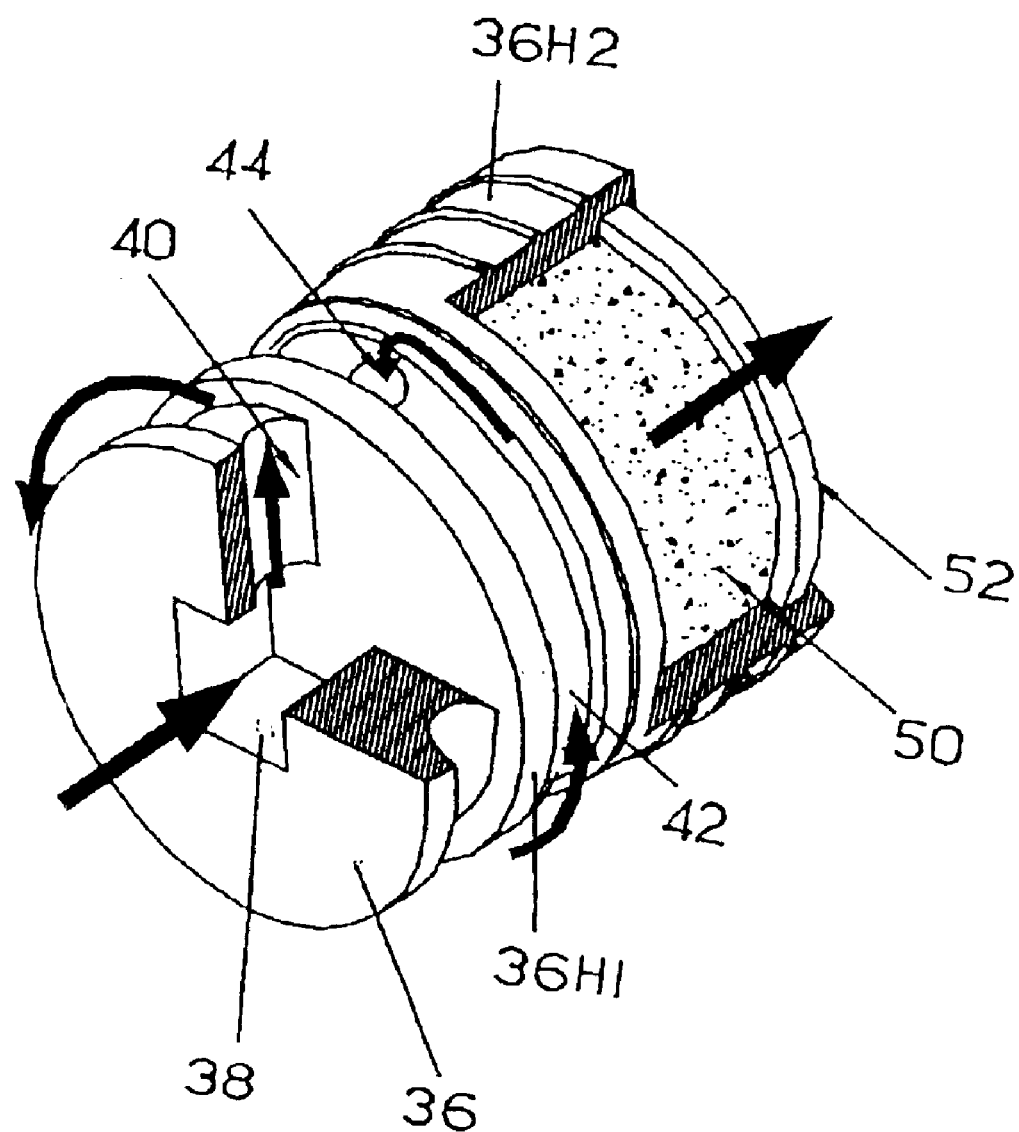
FIG. 9 is an enlarged perspective view of a vent cap for the vent cap assembly of FIG. 8.
Figure 10:
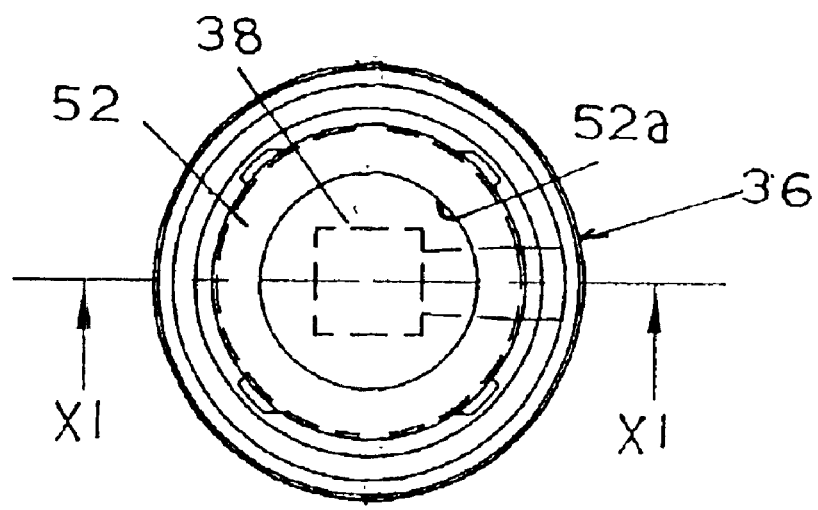
FIG. 10 is an enlarged front view of the vent cap for the vent cap assembly of FIG. 8.
Figure 11:
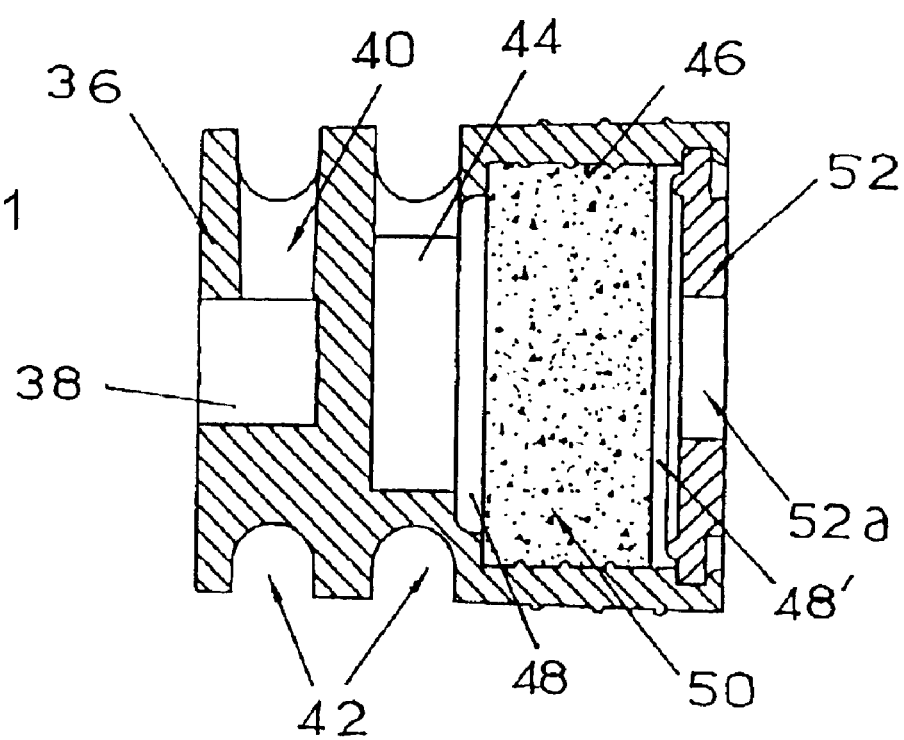
FIG. 11 is a cross sectional view of the vent cap along line XI—XI of FIG. 10.

FIGS. 9 through 11 show the vent cap assemblies 32 and 32' in greater detail. The vent cap assemblies 32 and 32' comprise a vent cap 36 fitted to the other ends of the side vent lines 16 and 16'. The vent cap 36 has a vent hole 38 provided in the vent cap 36 while extending in an axial direction thereof so that the vent hole 38 is in communication with the side vent lines 16 and 16', an upwardly extending vertical hole 40 provided in the vent cap 36 while extending upwardly in a radial direction of the vent cap 36 from the bottom thereof to communicate the vent hole 38 with the outer periphery of the vent cap 36, a helical path 42 helically provided in the surface of the vent cap 36 along the outer periphery of the vent cap 36 from the upper end of the first vertical hole 40 toward the outer end of the vent cap 36 remote from the vent hole 38 and a second vertical hole 44 downwardly extending from the downstream end of the helical path 42 to the center of the vent cap 36 in a radial direction reverse to that of the first vertical hole 40.

As noted from FIGS. 9 and 11, the vent hole 38, the first vertical hole 40, the helical path 42 and the second vertical hole 44 are positioned in an inside half 36H1 of the vent cap 36. In an outside half 36H2 of the vent cap 36 is provided a filter filling chamber 46 communicating through an inner opening 48 of the filter filling chamber 46 with the second vertical hole 44 and opening to atmosphere at an outside end of the vent cap 36.

A water-repellant microporous gas filter 50 is filled in the vent cap 36 by being fitted into the filter fitting chamber 46 while a filter cover 52 having a central hole 52a closes an outside opening 48' of the filter filling chamber 46. The water-repellant microporous gas filter 50 may be made of plastic alloy and comprise a fine grain (about 270 microns) chemically treated to exhibit water-repellant characteristics.

When any gas is vented by any cell of the battery, due to central blockage, the gas cannot escape from one compartment 14P to the other compartment 14'P. The gas is forced to escape through the other ends of the respective side vent lines 16 and 16' into the vent holes 38 in the respective vent caps 36. The gas then passes through the first vertical hole 40, traverses along the helical path 42 and enters through the second vertical hole 44. The gas is then filtered by the filter 50 and vented to the atmosphere through the center hole 52a in the filter cover 52. By this arrangement direct contact of electrolyte with filter is prevented.

In the battery of the invention, the central blockage means 22 shown in FIG. 7 serves to reduce a movement of the electrolyte between the cells to be able to resist the leakage of the electrolyte while the vent cap 36 having the helical path 42 shown in FIGS. 9 and 10 also serves to resist the leakage of the electrolyte. As both of the central blockage means 22 and the vent cap assemblies 32 and 32' shown in FIGS. 9 and 10 are used, the leakage can be more effectively accomplished. It will be noted that an air-lock is provided by the provision of the central blockage means 22 and the vent cap assemblies 32 and 32'.

The battery according to the present invention is highly resistant to acid leaks when it is turned through 90° on the front face or inverted, i.e., rotated through 180°. No acid leakage was noticed in the above tilted positions during the period of testing up to 12 hours.

The conventional side vented batteries are prone to acid leaks, when it is rotated through 90° along the shorter side in the direction of the vent line. It is in this direction that the efficacy of the central blockage means 22 of the vent lines is revealed. If there is used no central blockage means 22, the air can pass freely through the vent lines, resulting in continuous leakage of acid from the side vent lines 16 and 16' when tilted through 90° in the direction of the vent lines, but with the central blockage means 22 of the vent lines 16 and 16' according to the present invention, an air-lock is effectively formed which greatly reduces the leakage of electrolyte when the battery is tilted through 90° along the vent lines.

In addition to providing air lock preventing free flow of electrolyte when the battery is tilted, the central blockage also minimizes cell-to-cell variation of electrolyte when tilted, by preventing transfer of the electrolyte from one set of cells to the other set of cells.

The vent cap assemblies 32 and 32' provide significant resistance to flow of the electrolyte when the battery is tilted in different directions. Furthermore, the vent cap assemblies 32 and 32' can be easily push-fitted into the side vent lines 16 and 16' and thus separate heat-sealing and ultrasonic sealing can be avoided.

Figure 12:
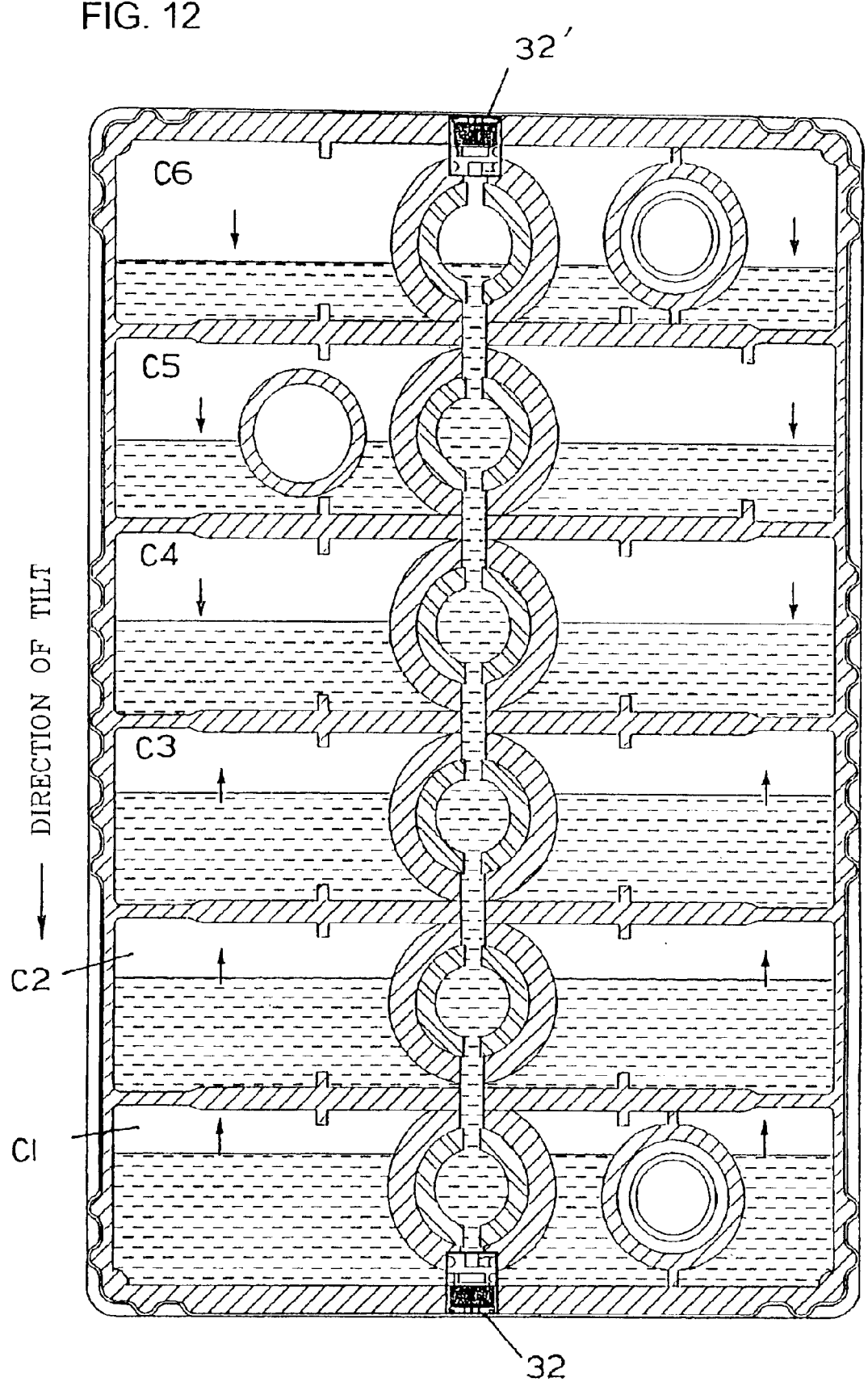
FIG. 12 is a horizontal cross sectional view showing a movement of electrolyte when there is tilted at 90° the battery with the vent cap assembly of FIG. 8 used, but without any central blockage means.
Figure 13:
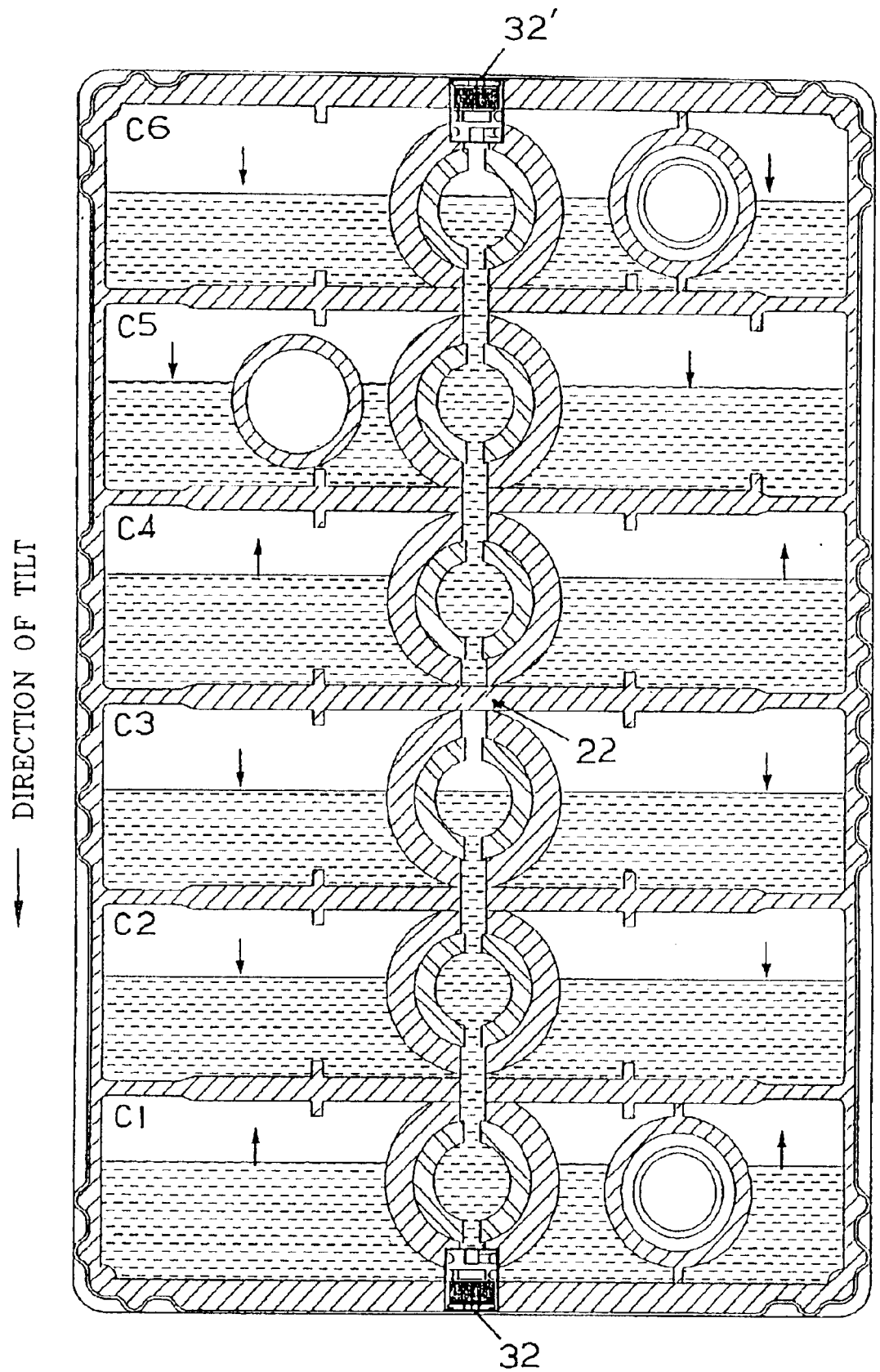
FIG. 13 is a horizontal cross sectional view showing a movement of electrolyte when there is tilted at 90° the battery with both of the vent cap assembly and the central blockage means of FIG. 8 used.

The effect of the central blockage construction of the vent lines can be foreseen from FIGS. 12 and 13. As shown in FIG. 12, the conventional side vent type battery (the battery having no central blockage construction) continuously transfer the electrolyte from the upper cell to the lower cell while it is tilted along the shorter side of the battery in the direction of the sides vent lines and as a result, the electrolyte remarkably moves from the upper cells to the lower cells. Furthermore, the vent cap assemblies 32 and 32' are subject to the substantial liquid pressure corresponding to all the length of the battery, which causes the more continuous leakage of the battery through the side vent lines.

On the other hand, with the central blockage construction of the vent lines 16 and 16' in the battery cover 14 as shown in FIG. 13, when the battery is tilted so that the cell C1 is downwardly faced, the electrolyte is prevented by the isolating wall 28 integral with the partition wall 24 of the central blockage means 22 from being transferred from the upper cells C4 to C6 to the lower cells C1 to C3. Furthermore, it is of significance that the liquid pressure applied to the vent cap assemblies 32 and 32' is reduced by half or less. In addition thereto, with the specially designed vent cap 36 containing water-repellent material together with the central blockage means 22, the microporous gas filter 50 serves to more effectively retard the leakage of the electrolyte from the side vent lines 16 and 16'.

Furthermore, the central blockage means of the vent line greatly reduces the cell to cell variation of the electrolyte level after a prolonged tilt at 90° along the shorter side, in the direction of the vent line. There are significant variations in the cell to cell electrolyte levels after 2 hours of tilt at 90° on the shorter side with the conventional side vented design, but in the leak retardant battery of the present invention, only a negligible variation of the electrolyte level is seen in a stabilized condition after the tilt test for 2 hours.

Figure 14:
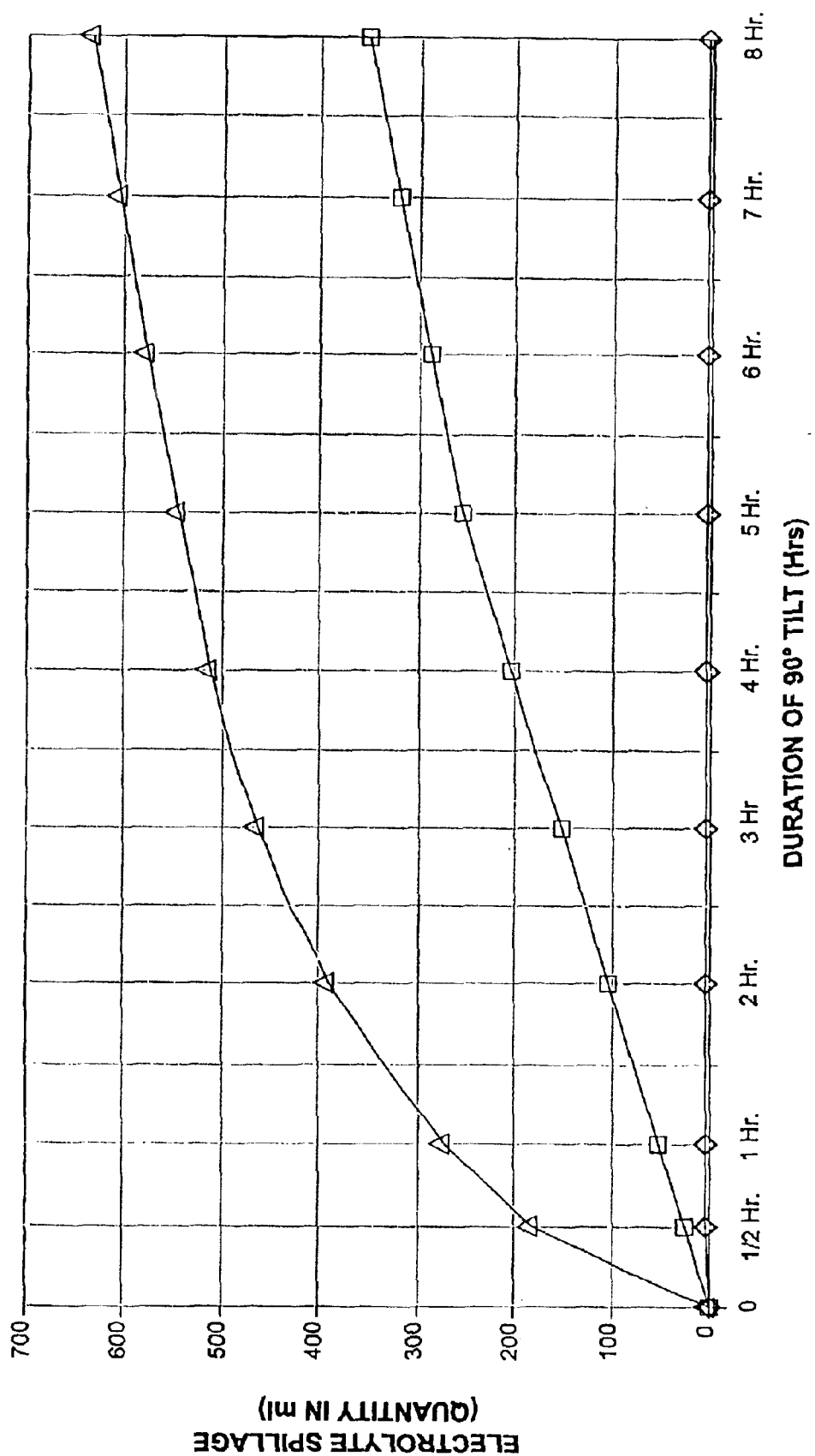
FIG. 14 shows graphical representation of test analysis of the battery when it is tilted at 90° along the vent line.

FIG. 14 shows a comparative analysis of the tilt tests at 90° along the vent line. The comparative analysis shows electrolyte spillage with the battery of the invention with the aforementioned vent cap design vis-à-vis the conventional side vented battery and the effect of the central blockage means of the vent line creating the air-lock and thereby substantially retarding the acid leakage to the negligible degree. In FIG. 14, the triangle mark designates the acid leakage characteristics of the conventional side vented battery; the square mark designates the acid leakage characteristics of the side vented battery of the invention with the new designed vent cap; and the lozenge mark designates the acid leakage characteristics of the side vented battery of the invention with both of the new designed vent cap and the central blockage means provided in the common vent lines.

It can be seen from FIG. 14 that the spillage of the electrolyte when the vent cap assembly of FIGS. 9 through 11 is used is less than the spillage when no special vent cap assembly is used. When the central blockage means is used, the amount of spillage gets greatly reduced.

Although one preferred embodiment of the invention has been described and illustrated with reference to the accompanying drawings, it will be understood by those skilled in the art that it is by way of example, and that various changes and modifications may be made without departing from the spirit and scope of the invention, which is defined only to the appended claims.

What is claimed is:

1. Leak retardant automotive battery comprising a housing for a plurality of cells housed therein, each of said cells having a filling plug, a battery cover fitted and heat-sealed to said housing to overlie the cells; and a pair of terminals mounted on said battery cover and connected to said cells characterized in that said battery cover is divided into two compartments by means of a central blockage, each compartment overlying a set of cells; that vent holes in said battery cover overlying each set of said cells are connected by means of a side vent line so that said cells in each set are in communication with each other; that said side vent lines are connected at their respective one end to said central blockage so as to isolate the two compartments; and that a vent cap assembly is provided at the other end of each of said side vent lines for escape of vented gases.

2. Leak retardant automotive battery as set forth in claim 1, wherein said central blockage has a separating wall to isolate the two side vent lines, a sealing ring being provided around said filling plug for sealing said body integral with a partition wall in said battery cover.

3. Leak retardant automotive battery as set forth in claim 1 or 2, wherein at least one of said vent cap assemblies comprises a vent cap and a gas filter fitted into the vent cap for allowing the vented gas to escape.

4. Leak retardant automotive battery as set forth in claim 1, wherein at least one of said vent cap assemblies comprises a vent cap fitted to said other end of said side vent line associated with said at least one vent cap assembly, and a gas filter fitted into the vent cap for allowing the vented gas to escape and wherein said vent cap has a vent hole in communication with said other end of said side vent line associated with said at least one vent cap assembly, a first upwardly extending vertical hole extending from said vent hole to the outer periphery of said vent cap, a helical path on the outer periphery connected at its one end to said first vertical hole and at its other end to a second downwardly extending vertical hole extending to the center of said vent cap so as to be in communication with said gas filter.

5. Leak retardant automotive battery as set forth in claim 2, wherein at least one of said vent cap assemblies comprises a vent cap fitted to said other end of said side vent line associated with said at least one vent cap assembly, and a gas filter fitted into the vent cap for allowing the vented gas to escape and wherein said vent cap has a vent hole in communication with said other end of said side vent line associated with said at least one vent cap assembly, a first upwardly extending vertical hole extending from said vent hole to the outer periphery of said vent cap, a helical path on the outer periphery connected at its one end to said first vertical hole and at its other end to a second downwardly extending vertical hole extending to the center of said vent cap so as to be in communication with said gas filter.

6. Leak retardant automotive battery as set forth in claim 4, wherein said gas filter is a water-repellant microporous gas filter.

7. Leak retardant automotive battery as set forth in claim 5, wherein said gas filter is a water-repellant microporous gas filter.

8. Leak retardant automotive battery as set forth in claim 6, wherein said microporous filter has a grain size of about 270 microns.

9. Leak retardant automotive battery as set forth in claim 7, wherein said microporous filter has a grain size of about 270 microns.

10. Leak retardant automotive battery as set forth in claim 1 or 2, wherein at least one of said vent cap assemblies comprises a vent cap fitted to said other end of said side vent line associated with said at least one vent cap assembly, a gas filter fitted into the vent cap for allowing the vented gas to escape, and said gas filter in said vent cap is covered by a filter cover having a hole for escape of vented gas.

11. Leak retardant automotive battery as set forth in claim 1, wherein each filling plug is fitted into each cell with an O-ring seal.

* * * * *